Nov. 9, 1954   N. F. CORNELIUS   2,693,821
RELIEF VALVE
Filed Oct. 19, 1951

Inventor
NELSON F. CORNELIUS

By Caswell & Lagaard
ATTORNEYS

# United States Patent Office 2,693,821
Patented Nov. 9, 1954

2,693,821

RELIEF VALVE

Nelson F. Cornelius, Anoka, Minn., assignor to The Cornelius Company, Minneapolis, Minn., a corporation of Minnesota Application October 19, 1951, Serial No. 252,135

2 Claims. (Cl. 137—508)

The herein disclosed invention relates to relief valves and has for an object to provide a construction by means of which positive unseating of the valve member is procured when the pressure within the relief valve rises to a predetermined value.

An object of the invention resides in constructing the valve with a body having a bore therein and an inlet communicating with said bore at one end and in further constructing the body with a chamber open at a portion thereof and communicating with said bore.

Another object of the invention resides in providing a piston slidable within said bore and having a passageway therein communicating with the passageway in said body and with said chamber and in providing a valve seat within said passageway extending transversely thereof and inwardly therefrom.

An object of the invention resides in providing a valve member preferably in the shape of a ball disposed within said passageway and adapted to seat against said valve seat.

A still further object of the invention resides in providing an insert in said piston in which the valve seat is formed and in further providing a cap at the open end of the piston adapted to hold said insert in place within the piston and serving as a spring seat.

A feature of the invention resides in providing a head secured to the body at the open end of the chamber therein and forming a second spring seat and in further providing a spring within said chamber engaging said spring seats and urging said piston in a direction toward the inlet.

An object of the invention resides in constructing the bore in said body with an enlargement forming a shoulder and in further constructing the piston with a shoulder engageable therewith and functioning to limit movement of the piston toward the inlet.

A feature of the invention resides in providing an insert insertable into the piston and having formed thereon the valve seat.

An object of the invention resides in constructing said insert with an annular rabbet and a tubular portion extending axially in the direction of said passageway and in further providing a cap extending across the open end of the piston and engaging said tubular portion to form with said rabbet a groove for the reception of an O-ring maintaining a tight fit between said insert and piston.

An object of the invention resides in providing an abutment preferably in the form of a pin secured to said head and adapted to engage the valve member to dislodge the same from said seat upon movement of the piston away from the inlet.

Other objects of the invention reside in the novel combination and arrangement of parts and in the details of construction hereinafter illustrated and/or described.

Figure 1:
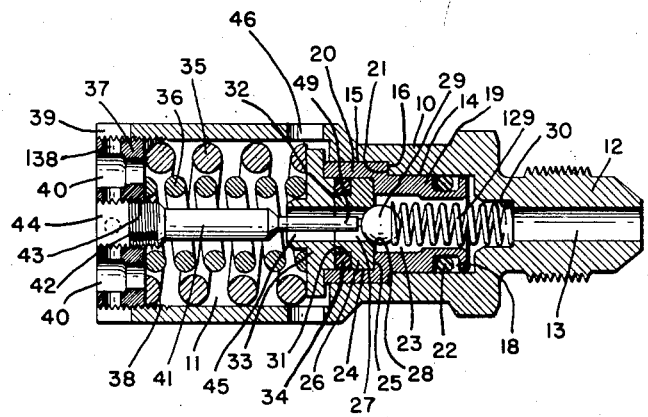
Fig. 1 is a longitudinal sectional view of a relief valve illustrating an embodiment of the instant invention and taken on line 1—1 of Fig. 3 and illustrating the valve in closed position.

The construction shown in the drawings comprises a body having a bore therein formed with an enlargement and providing a shoulder therebetween. This bore communicates with a chamber in the body open at one end. An inlet formed on said body communicates with said bore at its other end. Slidable in the bore is a piston having a shoulder for engagement with the shoulder in the body and having a passageway extending through the same and communicating with said chamber and inlet. The passageway of said piston is formed with an enlargement providing in the piston a shoulder. An insert constructed of a somewhat resilient material is received within the enlargement and rests upon said shoulder in the piston. This insert has a passageway therethrough communicating with the passageway in said piston and also with the chamber in the body. The said insert is formed with an annular valve seat encircling the passageway therein, and is further formed with an annular rabbet at the outermost portion thereof. A valve member in the form of a ball is seated against the valve seat. Mounted on the end of the piston is a cap functioning as a spring seat and having a passageway communicating with the passageway in said insert and forming with said rabbet an annular groove in which is disposed an O-ring contacting the enlargement of the bore in said piston and the tubular portion of the insert formed by said rabbet. Mounted at the open end of said chamber is a head which forms a spring seat and between the said spring seat is disposed a compression coil spring which urges the piston into engagement with the shoulder in the body of the valve. A dislodging device having a shank secured to said head, extends axially of the valve and is formed with a pin which extends through the passageway in said cap and insert and into juxtaposition in respect to said valve member. A compression coil spring engaging said body and said valve member urges the valve member into contact with said valve seat. Upon increase of pressure within the bore of the body the piston travels outwardly and moves the valve seat away from the valve member. To resist the valve member following the piston, the dislodging device is employed, the pin of which engages the valve member and arrests the movement thereof, allowing the pressure in the valve to move the piston and the valve seat away from the valve member.

The invention consists of a body 10 constructed as a casting or from bar stock as desired. This body has formed in one end thereof a chamber 11 which is open at one end. At the other end of the body is provided a nipple 12 to which may be connected a suitable connector for connecting the source of fluid under pressure adapted to be controlled by the valve. This nipple has a passageway therein indicated at 13. Between the chamber 11 and the passageway 13 the body 10 is formed with a bore 14 which communicates at one end with the passageway 13. This bore has an enlargement 15 which forms with the bore 14 a shoulder indicated at 16.

Slidably mounted in the bore 14 is a piston 19 which is constructed with an annular groove 18. In this groove is disposed an O-ring 22 of flexible material such as rubber or the like and which engages the wall of the body 10 formed by the bore 14 and also the bottom and either end of the groove 18. This O-ring forms a tight seal between the piston and the body. The piston 19 has an enlargement 20 which forms in said piston a shoulder 21 engageable with the shoulder 16 and serving to restrain movement of the piston toward the nipple 12. The piston 19 is constructed with a passageway 23 which communicates with the passageway 13 in nipple 12. This passageway has an enlarged bore 24 at the end of the same adjoining chamber 11 of greater diameter than the passageway 23 and forming in said piston at the end of said passageway a shoulder 25. An insert 26 at the end of said passageway is received within the bore 24 and rests on the shoulder 25. This insert has a passageway 27 in the same and is formed with a valve seat 28 encircling said passageway. A valve member 29 in the form of a ball is disposed in the passageway 23 and engages the seat 28 to close communication between passageways 27 and 23. This valve member is urged into engagement with the seat 28 by means of a compression coil spring 129 which is seated at one end in a socket 30 formed in the body 10 at the end of the passageway 13 and at its other end against said valve member. The insert 26 is preferably constructed of some suitable material which has a certain amount of resiliency such as nylon or the like which has been found highly desirable for the purpose.

To provide a tight joint between the insert 26 and the piston 19 a rabbet 31 is formed in the said insert which leaves a tubular portion 32 encircling the passageway 27. A cap 33 rests upon the end of the enlargement 20 of piston 19 and also enters the bore 24 at the end of the passageway 23 of said piston and engages the end of the tubular portion 32 of insert 26. This cap forms with the rabbet 31 a groove in which an O-ring 34 is disposed. This O-ring engages the insert 26 as well as the bore 24 of piston 19 and forms a seal therebetween. The cap 33 is formed with a passageway 45 which communicates with the chamber 11 as well as with the passageway 27 in the insert 26. The bore 24 is slightly smaller than the bore 14 so that pressure against the piston 19 is greater than the pressure against the insert 26 thereby maintaining said insert seated against the shoulder 25.

The cap 33 serves as a spring seat against which two springs 35 and 36 are seated. These springs are further seated against a head 37 screwed into threads 38 formed in the open end of the body 10. The head 37 has transverse openings 138 and the body 10 has slots 39 registering therewith. A key, wire or other locking device may be inserted through the openings 138 and slot 39 to hold the head in adjusted position. For rotating the head two sockets 40 are formed in the cap 37 and in which a spanner wrench may be inserted.

For the purpose of unseating the valve member 29 from the valve seat 23 a dislodging device 41 is employed. This device has a threaded shank 42 which is screwed into threads 43 formed in the cap 37. Issuing from the shank 42 is a pin 49 which terminates just short of the valve member 29 and extends through the passageway 45 formed in the cap 33. The shank 42 has a screw driver slot 44 formed therein which is of appreciable length and through which the wire or cotter key holding the cap in position may extend to hold said dislodging device in adjusted position. Pin 49 is formed with a socket 47 at the end of the same and against which the valve member 29 seats to maintain the valve member centered with respect to the valve seat 28.

A number of ventholes 46 formed in the body 10 together with the sockets 40 which extend completely through the cap 37 permit air to flow into and out of the chamber 11 without obstruction.

Figure 2:
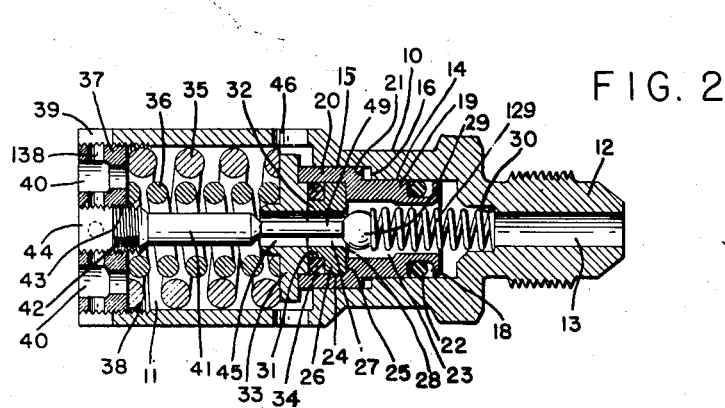
Fig. 2 is a view similar to Fig. 1 illustrating the valve in open position.
Figure 3:
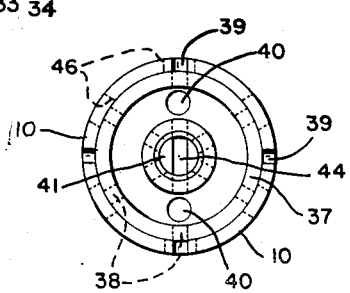
Fig. 3 is an end elevational view of the relief valve.
Figure 4:
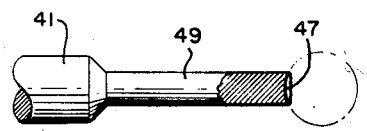
Fig. 4 is an enlarged fragmentary elevational view partly in section of the dislodging device of the invention.

In operation the nipple 12 is connected to the source of fluid under pressure by means of a suitable connector adapted to be screwed on the same. The pressure at which the valve releases is controlled by the position of the head 37 along the threads 38. The pin 41 is also adjusted so that the same is within a short distance from the ball 29 as shown in Fig. 1. When the pressure in passageways 13 and 23 and the bore 14 exceeds the desired pressure, the piston 19 moves toward the left as viewed in Fig. 1, carrying with it the insert 26 having the valve seat 28. Valve member 29 follows with the piston being urged into engagement with the seat 28 by means of spring 129. As soon as the valve member 29 engages the pin 49, the movement of the same is arrested and the insert and piston continue to travel. This opens the valve as shown in Fig. 2 and the surplus fluid is allowed to pass by the valve seat 28 through the passageways 27 and 45 and into the chamber 11 where it escapes through vents 46 and the sockets 40 to the atmosphere.

The advantages of the invention are manifest. The device can be constructed entirely from screw machine parts at a minimum expense. The valve is capable of handling high pressures and is sensitive to variations in pressure. By the use of the O-rings tight joints are provided preventing leakage of the valve along the sliding parts. With the invention a ball valve member can be employed and the unseating of the ball valve member is positively affected. The pressure at which the valve is desired to be set can be accurately adjusted and also the distance of travel of the piston before opening of the valve can likewise be adjusted.

Changes in the specific form of the invention, as herein described, may be made within the scope of what is claimed without departing from the spirit of the invention.

Having described the invention, what is claimed as new and desired to be protected by Letters Patent is:

1. In a relief valve, a body having an inlet, a chamber open at one portion thereof and in communication with the exterior and a bore communicating at one end with said chamber and at its other end with said inlet, a piston slidable along said bore and having a passageway therein communicating with said chamber and inlet, said passageway having an enlarged bore at the end thereof adjoining said chamber and forming in said piston a shoulder, an annular insert received within the bore of said piston and engaging said shoulder and having a passageway therethrough communicating with the passageway in said piston and said chamber, a valve seat formed on said insert and encircling said second named passageway, said insert having an outwardly facing annular rabbet therein and forming a tubular portion extending toward the open end of said chamber, a cap on said piston engaging said tubular portion and forming with said rabbet an annular groove, an O-ring received within said groove and engaging said tubular portion and the bore of said passageway in said sleeve to form a seal therebetween, said cap forming a spring seat, a valve member disposed in said first named passageway, resilient means urging said member toward said valve seat, a head carried by said body and extending across the open end of said chamber and forming a spring seat, a spring acting between said spring seats and urging said piston toward said inlet, stop means acting between said piston and body and terminating sliding movement of said piston and a dislodging device reacting against said body and engageable with said valve member to unseat said valve member from said seat upon movement of said piston toward said head.

2. In a relief valve, a body having an inlet, a chamber open at one portion thereof and in communication with the exterior and a bore communicating at one end with said chamber and at its other end with said inlet, a piston slidable along said bore and having a passageway therein communicating with said chamber and inlet, said passageway having an enlarged bore at the end thereof adjoining said chamber and forming in said piston a shoulder, an annular insert received within the bore of said piston and engaging said shoulder and having a passageway therethrough communicating with the passageway in said piston and said chamber, a valve seat formed on said insert and encircling said second named passageway, said insert having an outwardly facing annular rabbet therein and forming a tubular portion extending toward the open end of said chamber, a cap on said piston engaging said tubular portion and forming with said rabbet an annular groove, an O-ring received within said groove and engaging said tubular portion and the bore of said passageway in said piston to form a seal therebetween, said cap forming a spring seat, a valve member disposed in said first named passageway, resilient means urging said member toward said valve seat, a head carried by said body and extending across the open end of said chamber and forming a spring seat, a spring acting between said spring seats and urging said piston toward said inlet, stop means acting between said piston and body and terminating sliding movement of the piston and a dislodging device reacting against said body and engageable with said valve member to unseat said valve member from said seat upon movement of said piston toward said head, the bore in said piston being of smaller diameter than the bore in said body.

References Cited in the file of this patent

UNITED STATES PATENTS

| Number | Name | Date |
| --- | --- | --- |
| 1,072,334 | Kulla | Sept. 2, 1913 |
| 2,231,059 | Douglass et al. | Feb. 11, 1941 |
| 2,390,134 | Svirsky | Dec. 4, 1945 |
| 2,472,049 | Schneck | May 31, 1949 |
| 2,529,731 | Hollerith | Nov. 14, 1950 |